United States Patent [19]

Beaty, Jr. et al.

[11] 3,945,105
[45] Mar. 23, 1976

[54] AUTOMATIC GRATE CHANGING SYSTEM AND METHODS OF UTILIZING AND CONSTRUCTING SAME

[76] Inventors: Thomas Beaty, Jr., 24690 Madison Court, Farmington, Mich. 48024; Daniel Fournier, 26240 Marlene, Roseville, Mich. 48066

[22] Filed: July 19, 1974

[21] Appl. No.: 490,356

[52] U.S. Cl. ............ 29/401 F; 29/200 R; 29/200 D; 29/427; 29/431; 432/3; 432/76; 432/239; 432/241; 432/246
[51] Int. Cl.² .......................................... B23P 7/00
[58] Field of Search ...... 29/427, 453, 208 R, 208 D, 29/208 F, 200 D, 200 B, 200 P, 200 R, 401 R, 401 F, 426, 429, 431, 505, 428; 198/18 S, 19 S; 432/76, 3, 8, 239, 241, 246; 266/21

[56] References Cited
UNITED STATES PATENTS

| | | | |
|---|---|---|---|
| 2,028,479 | 1/1936 | Spicer | 432/239 X |
| 3,434,702 | 3/1969 | Krause | 432/241 X |
| 3,530,565 | 9/1970 | Lanza et al. | 29/401 |
| 3,577,758 | 5/1971 | Adair | 29/200 D |
| 3,788,062 | 1/1974 | Booth | 29/401 |
| 3,855,684 | 12/1974 | Kendall | 29/200 D |
| 3,861,659 | 1/1975 | Euenstad | 432/239 X |

Primary Examiner—C. W. Lanham
Assistant Examiner—Joseph A. Walkowski
Attorney, Agent, or Firm—Irving M. Weiner; Pamela S. Burt

[57] ABSTRACT

An apparatus and method for automatically replacing damaged conveyor grates which can be remotely controlled. The apparatus is disposed slightly above the empty, return side of the conveyor at the cool end, and performs its function in this maintenance area. The apparatus employs a plurality of working heads which remove the damaged grate and replace it with a new grate without interrupting conveyor motion. The working heads are suspended above the conveyor in the maintenance area by a plurality of carriages which permit the working heads to access any grate within the maintenance area. The carriages also allow the working heads to move with the conveyor during the grate replacement cycle. Although the manipulation of these heads and carriages is largely automatic, the operator can initiate, direct and observe the apparatus' movements from a remote station thereby isolating him from a hazardous environment.

10 Claims, 12 Drawing Figures

AUTOMATIC GRATE CHANGING SYSTEM AND METHODS OF UTILIZING AND CONSTRUCTING SAME

The present invention relates generally to an apparatus, system and method for changing articles removably affixed to a conveyor. In particular, the present invention relates to an apparatus and method for mechanically replacing damaged grates in a conveyor system used in the processing of iron ore.

BACKGROUND OF THE INVENTION

As is quite well known to those skilled in the art, iron ore pellets are formed from the raw material which are subsequently cured or heat treated in a furnace or kiln. A conveyor system is provided to transport these pellets from a loading area to the furnace.

One such conveyor system is comprised of several parallel strands of chain links which form a continuous vertical loop. The strands are interconnected by chain through rods which space the strands a predetermined and equal distance from each other. A plurality of grates are rotatably connected to each through rod which form the conveying surface of the conveyor. On the delivery side of the conveyor, the grates lie substantially horizontal, overlapping one another so as to form a continuous, substantially planar conveying surface on which the iron ore pellets are transported. On the return side of the conveyor, gravity causes each grate to assume a substantially vertical position. The grates are rotatably connected to the through rod by a retainer clip which is fastened to the grate. These retainer clips are disposed upwardly on the return side of the conveyor.

During the processing operation, the grates are often damaged and must be replaced. Heretofore, the grates have been replaced manually by a repairman. The repairman either unfastens or cuts the retainer clip fasteners so that the damaged grate can be removed from the through rod. The manual grate replacement process is a tedious and time-consuming operation. Because the conveyor is traveling at a fairly rapid pace, and because the manual replacement of a damaged grate is a tedious repair, it is very hazardous and most difficult, if not impossible, for a repairman to replace a damaged grate while the conveyor is in motion. Hence, the manual replacement of a damaged grate often results in a conveyor shut-down which is both inefficient and costly.

The working environment for the repairman is not only very hot, by virtue of the conveyor's proximity to the furnace, but also consists of an atmosphere contaminated with iron dust. These circumstances present a very serious health hazard to the repairman.

To alleviate the aforementioned difficulties associated with prior art technology, the present invention is comprised of an apparatus and method for mechanically replacing damaged conveyor grates which is remotely controlled. The present invention discloses a device which can mechanically remove a damaged grate and replace it with a new grate while the operator observes and directs the replacement process from an isolated control area or room. Since the present method of grate replacement is much quicker than manual replacement, the conveyor need not be stopped, thereby avoiding costly down-time.

SUMMARY OF THE INVENTION

The present invention provides an automatic system and method for selectively replacing articles which are removably interconnected to a movable conveyor. A first means is provided for clampingly engaging a damaged grate connected to the moving conveyor, and a second means is provided for disengaging the damaged grate from the conveyor. A third means positions a new grate on the conveyor at the location previously occupied by the damaged grate, and a fourth means connects the new grate to the conveyor. A fifth means is provided in the form of carriages to movably suspend the first, second, third and fourth means over the conveyor in the working area, so as to access the damaged grate. A sixth means enables the fifth means to lockingly engage the conveyor and to translate with it as the damaged grate is being replaced. A seventh means automatically controls and sequences means 1–6 so that a grate may be replaced quickly and efficiently.

Accordingly, it is a primary object of the present invention to provide an automatic system and method for selectively replacing damaged grates which are removably interconnected to a movable conveyor.

DETAILED DESCRIPTION OF THE PREFERRED EMBODIMENT

Figure 1:
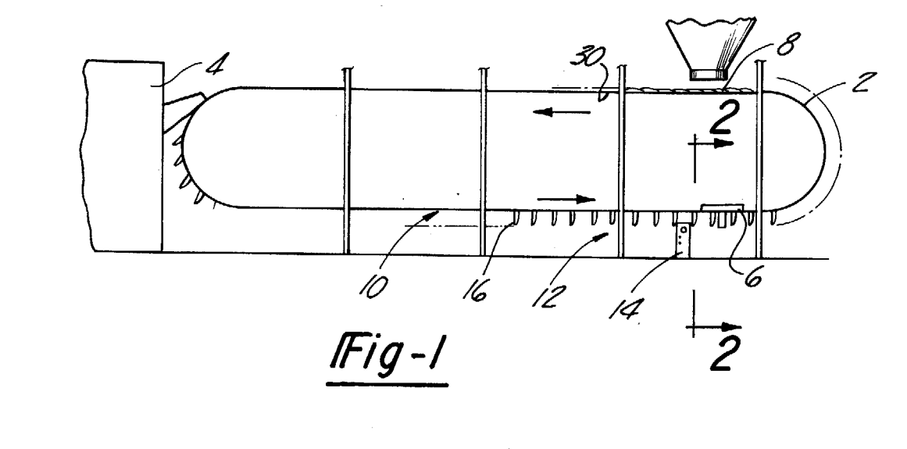
FIG. 1 is a diagrammatic depiction of an iron ore conveyor and an automatic grate changing system.

Referring to FIG. 1, an iron ore processing conveyor 2, a heat treating furnace 4, and an automatic grate changing apparatus 6 are diagrammatically depicted. The conveyor 2 transports iron ore pellets from the loading area 8 to the furnace 4. The automatic grate changing apparatus 6 is disposed over the return side 10 of the conveyor at the end furthest away from the furnace 4. The apparatus performs its functions in a maintenance area 12, and is remotely controlled at control panel 14. The direction of conveyor motion is illustrated by the arrows provided. The conveyor 2 carries a plurality of grates 16 which are rotatably connected to the conveyor.

Figure 3:
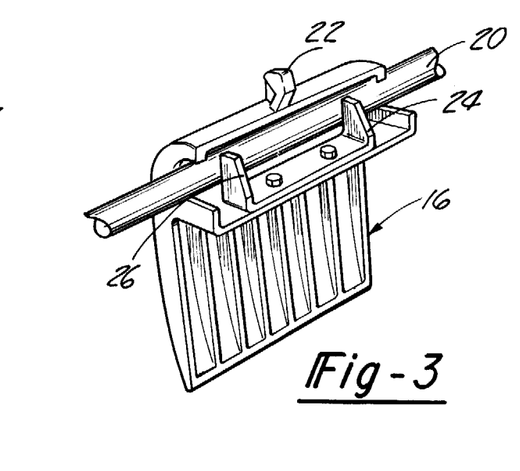
FIG. 3 is a perspective view of a grate as attached to a conveyor chain through rod.

In FIG. 3 a grate 16 is shown attached to a conveyor through rod 20. The grate 16 has a C-shaped upper end portion which mates with the conveyor's through rod 20. A tab is provided on the grate 22 which is centrally disposed on the upper surface thereof. A retainer clip 24 is fixedly fastened to the grate 20 such that the upwardly protruding ears 26 of the retainer clip 24 abuttingly contact the through rod 20, thereby rotatably securing the grate 16 to the through rod.

As can best be seen in FIG. 1, when the grates 16 are disposed on the delivery side 30 of the conveyor, they assume a substantially horizontal position, thereby providing a conveyor surface on which the pellets are transported. On the return side 10 of the conveyor, the grates 16 assume a substantially vertical position, such that the retainer clip 24 is disposed upwardly.

Referring now to FIG. 1, there is shown the conveyor 2 and the automatic grate changing apparatus 6. The conveyor 2 which is disposed slightly below the apparatus 6 is comprised of six strands of chain link 32 which are interconnected by through rods 20. Between each strand 32 three grates 16 are rotatably affixed to the through rod, thereby providing 15 rows of grates. Each chain link is provided with a centrally disposed aperture 34. Vertical support columns 36 are provided for structurally supporting the apparatus. Onto these vertical support columns 36 a main support channel 38 is rigidly and perpendicularly affixed thereto, on both sides of the conveyor 2 in the maintenance area 12. A pair of triangular tracks 40 are rigidly affixed to the main support channels 38, and extend longitudinally along the entire length of said support chanels.

Figure 4:
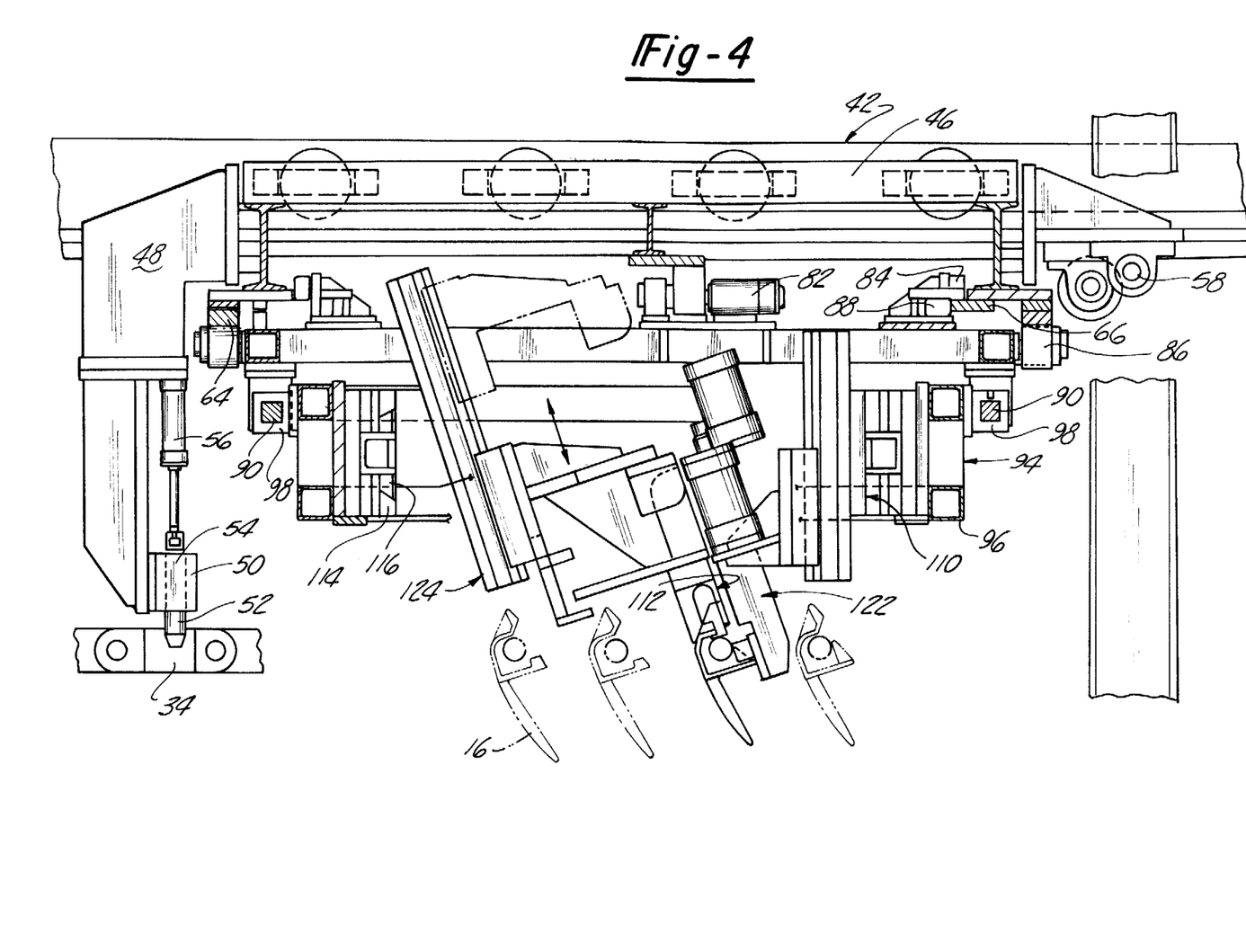
FIG. 4 is a partial cross-sectional view taken substantially along the line 4—4 of FIG. 2.

A primary carriage 42 is disposed perpendicularly between the main support channels and is movably connected to same by primary carriage rollers 44 which are retained in the primary carriage frame 46 (FIG. 4). A plurality of drive pin arms 48 are rigidly affixed to the primary carriage frame 46 and are disposed perpendicularly thereto in a downward fashion. One drive pin arm 48 is disposed over each of the conveyor chain's apertures 34.

As can best be seen in FIG. 4, the drive pin arms 48 are positioned forward of the primary carriage frame 46 and hang slightly above the conveyor 2. The lower end portion 50 of the drive pin arm 48 is vertically apertured. A drive pin 52 is slidably and vertically retained in said aperture 54 by a vertical drive pin drive means 56. Activation of said drive means 56 causes the drive pin 52 to extend and retract vertically so as to engage and disengage the chain aperture 34. At the rearward end of the primary carriage 42 a primary carriage drive means 58 is provided.

Figure 5:
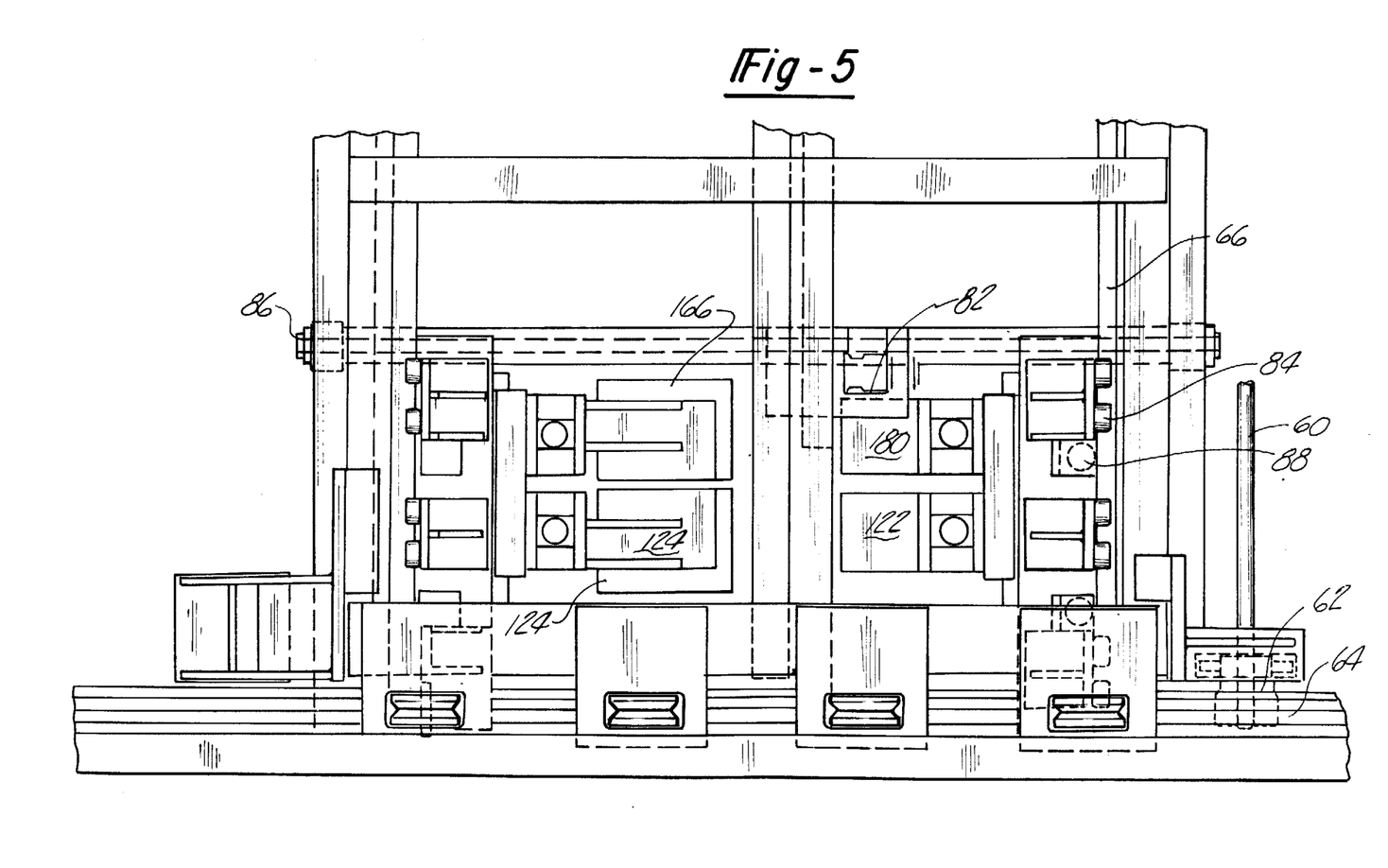
FIG. 5 is a partial plan view of the primary and secondary carriages.

As can best be seen in FIG. 5, the primary carriage drive means 58 is connected to a shaft 60 which in turn is connected to a pinion 62. The pinion engages a rack 64 which is located on the main support channel 38. An identical rack and pinion means is similarly disposed on the opposite side of the primary carriage frame 46. Rotation of the drive means 58 therefore translates the primary carriage along the longitudinal axis of the main support channels 38. A pair of secondary carriage tracks 66 is rigidly affixed to the primary carriage and is disposed along the longitudinal axis of said primary carriage.

Figure 2:
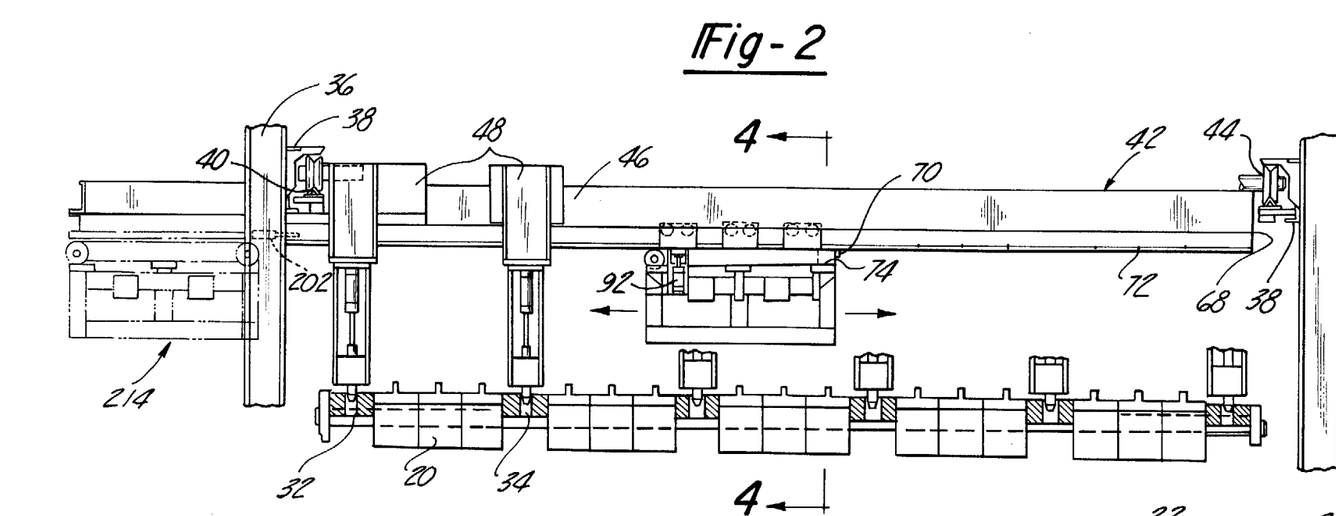
FIG. 2 is a partial cross-sectional view taken substantially along the line 2—2 of FIG. 1.

As diagrammatically shown in FIG. 2, the automatic grate changing apparatus is provided with a grate row locating means, such as an air manifold 68 and a pressure sensor 70, to enable the apparatus to automatically locate over the row in which the damaged grate resides. A signalling means, such as an aperture 72 in an air manifold 68, is provided on the primary carriage over each grate location. A signal detection means, such as a pressure sensor 70, is attached to the secondary carriage 74. Through this grate row locating means, the apparatus can automatically position itself over the desired grate row.

Figures 6, 7:
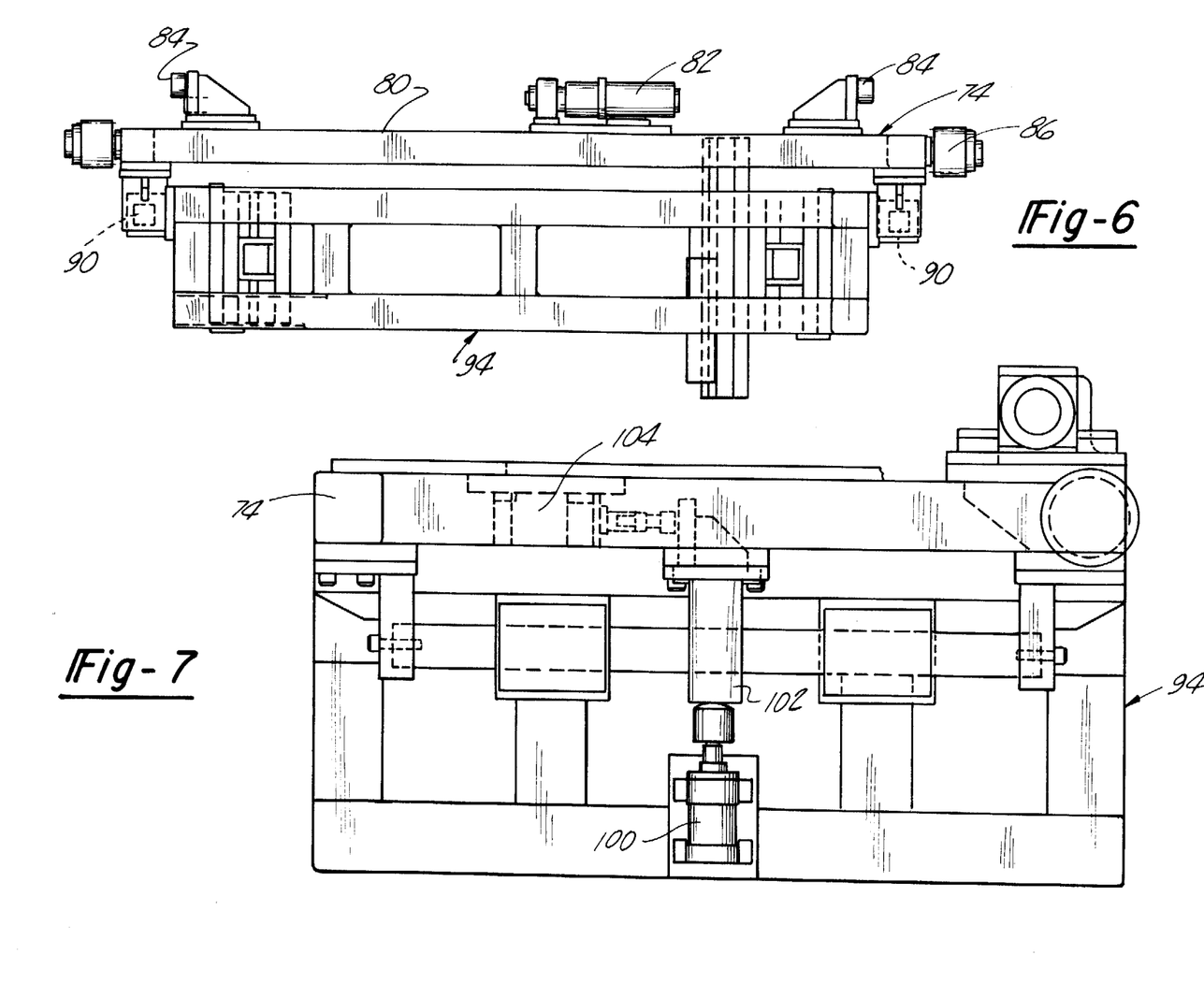
FIG. 6 is a side elevational view of the secondary carriage.
FIG. 7 is a side view of the auxiliary carriage.

FIG. 6 shows the secondary carriage 74. The secondary carriage 74 is comprised of a frame 80, a secondary carriage drive means 82 and secondary carriage rollers 84. A pair of secondary carriage pinions 86 are disposed on either side of the secondary carriage 74.

As can best be seen in FIG. 4, the secondary carriage rollers 84 translate along the secondary carriage tracks 66 which are affixed to the primary carriage 42. Side rollers 88 are provided to insure proper horizontal relationship between the secondary carriage 74 and the secondary carriage tracks 66. The secondary carriage drive means 82 is affixed to the secondary carriage 74, and drives the secondary carriage pinions 86. A pair of auxiliary carriage tracks 90 is rigidly affixed to the secondary carriage 74 and is disposed along the longitudinal axis of said secondary carriage 74.

As can beest be seen in FIG. 2, a secondary carriage lock cylinder 92 is affixed to the secondary carriage 74 and is disposed vertically. Activation of the secondary carriage lock cylinder 92 causes same to extend and retract, thereby abuttingly engaging and disengaging the primary carriage 42.

FIG. 4 shows an auxiliary carriage 94 which is comprised of a frame 96, and a pair of track members 98 which mates with and slidably engages the auxiliary carriage tracks 90 which are attached to the secondary carriage 74.

As can best be seen in FIG. 7, the auxiliary carriage 94 is provided with an auxiliary carriage locking cylinder 100 which is rigidly attached thereto. The secondary carriage 74 is provided with an auxiliary carriage locking member 102 which is rigidly affixed to the secondary carriage 74 and is disposed directly above the auxiliary carriage locking cylinder 100. Activation of the auxiliary carriage locking cylinder 100 causes same to extend and retract, thereby abuttingly contacting the auxiliary carriage locking member 102. Said abutting contact and the frictional forces which result, releasably secure the auxiliary carriage 94 to the secondary carriage 74. A hunt cylinder 104 is provided for translating the auxiliary carriage 94 with respect to the secondary carriage 74.

As can best be seen in FIG. 4, an indexing carriage 110 is provided to retain the working heads 112 and translate same with respect to the auxiliary carriage 94 in the direction of the longitudinal axis of the primary carriage 42. The auxiliary carriage frame 96 is provided with an indexing carriage track 114. The indexing carriage 110 is provided with an indexing carriage track member 116 which mates with the indexing carriage track 114, thereby slidably securing said indexing carriage 110 to said auxiliary carriage 94.

Figure 8:
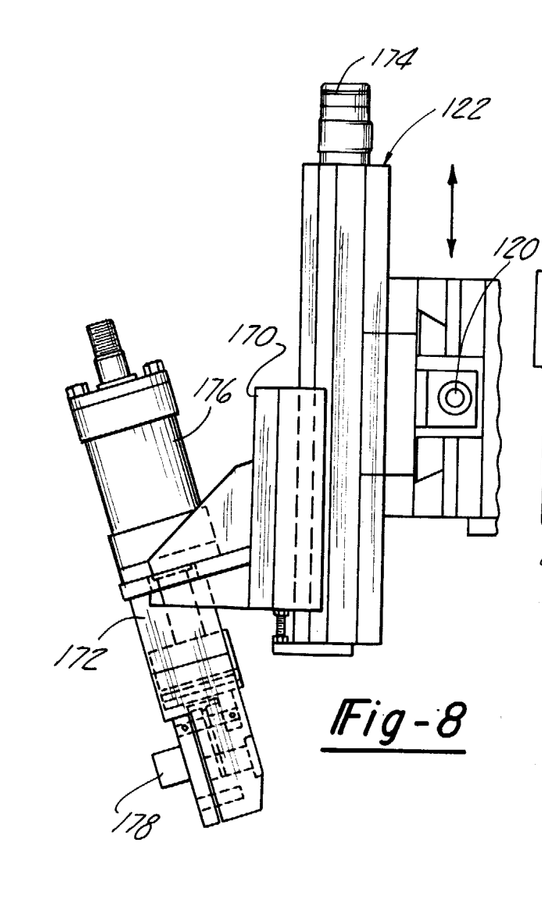
FIG. 8 is a side view of the removal bending head.
Figure 9:
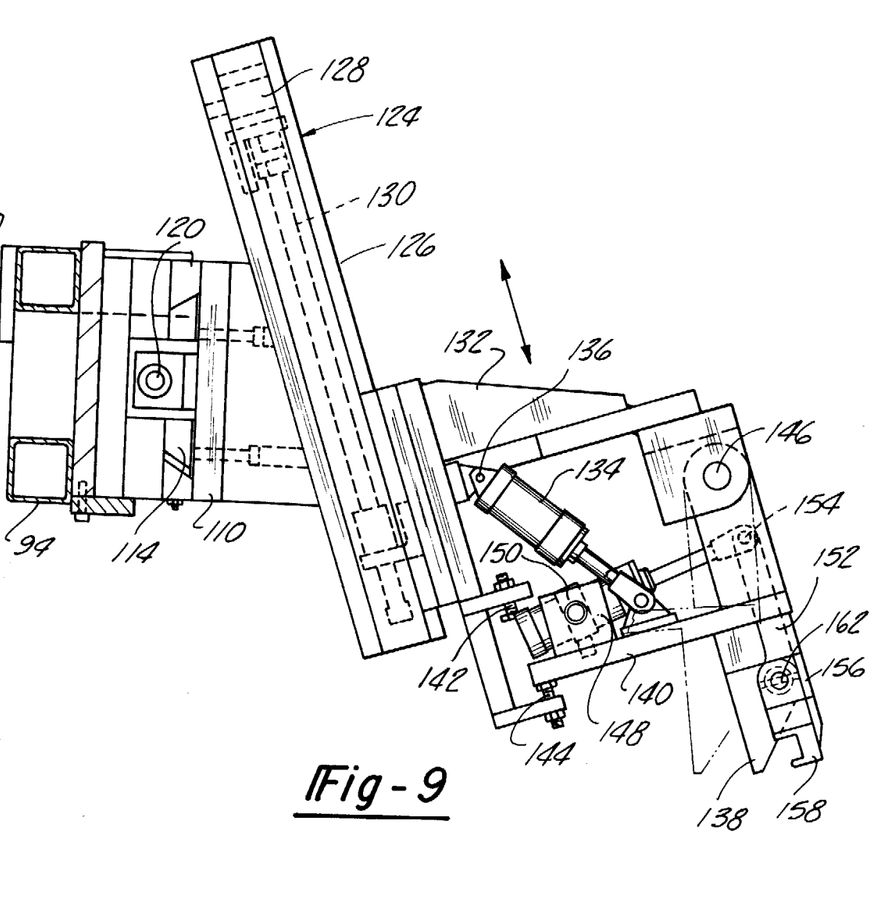
FIG. 9 is a side view of the removal clamping head.

As can best be seen in FIGS. 8 and 9, the indexing carriage is provided with a ball screw mechanism 120 which is driven by a means, such as a hydraulic motor, so as to translate the indexing carriage 110 with respect to the auxiliary carriage 94.

FIGS. 8 and 9 refer to the removal bending 122 and removal clamping 124 heads, respectively. Their position with respect to one another can be seen from FIGS. 4 and 5.

Referring to FIG. 9, the auxiliary carriage 94 is shown slidably connected to the indexing carriage 110. It is to be noted that the auxiliary carriage 94 is slidably connected to the secondary carriage 74 which is not shown. The indexing carriage 110 moves slidably along the indexing carriage track 114 and thereby indexes the clamping head base 126 in a direction transverse the longitudinal axis of said base, said base being fixedly mounted to the indexing carriage 110. Within said base, a hydraulic motor 128 is located. Said motor turns a ball screw 130 to raise and lower the removal clamping head 124 along the longitudinal axis of said base through a clamping head mounting bracket 132 which supports said assembly.

The removal clamping head 124 will now be described. A pivot cylinder 134 is pivotally mounted to the mounting bracket 132 by an upper pivot cylinder rod 136 and is also pivotally mounted to the clamping by a lower pivot cylinder rod. FIG. 9 shows the movement of the arm of the clamping member 138 between the upper and lower stop screws 142, 144, respectively. When the pivot cylinder 134 is extended, the arm 140 of the clamping member 138 engages the lower stop screw 144 which stops the rotation of the clamping head 138 about the clamping head pivot rod 146. Said clamping member is pivotally attached to the mounting bracket 132 by said rod.

When the pivot cylinder 134 retracts, the clamping member arm 140 swings upwardly on the clamping head pivot rod 146 until the upper stop screw 142 is engaged to halt said movement.

A clamping cylinder 148 is pivotally attached to the clamping cylinder bracket 150 which is fixedly mounted to the clamping member arm 140. The clamping cylinder 148 is also pivotally connected to a clamping arm 152 through the clamping arm pivot rod 154 which is attached on the sides of the clamping head frame 156. The clamping arm 152 has two lower jaws 158, 160 which can best be seen in FIG. 11. The clamping arm 152 pivots about the lower clamp pivot rod 162 which also is attached to the sides of the clamping head frame 156. When the clamping cylinder 148 extends, the clamping arm 152 pivots about the clamping arm pivot rod 154 and the lower clamp pivot rod 162 to rotate the jaws 158, 160 toward the clamping cylinder 148. When the clamping cylinder 148 retracts, the jaws 158, 160 rotate away from said cylinder.

The removal clamping head 124 is also provided with an air detect 164 or other sensing device which senses the presence of a grate tab 22 when said tab 22 is positioned substantially against said device. Said air detect is the only distinguishing feature between the removal clamping head 124 and the replacement clamping head 166. Consequently, the description of said replacement clamping head 116 is omitted. The relationship between all four heads can be seen in FIG. 5.

Referring to FIG. 8, the removal bending head 122 is shown. Said head is slidably mounted to a bending head base 168 by the bending head mounting bracket 170. Said bracket is fixedly attached to a bending head frame 172. The mounting bracket 170 and thus the bending head frame 172 move along the longitudinal axis of said base in the same fashion as the clamping head mounting bracket 132 moves along the clamping head base 126. That is, by means of a hydraulic motor 174 which drives a ball screw which is not shown.

The bending head base 168 is fixidly attached to the indexing carriage 110 which in turn is slidably mounted to the auxiliary carriage 94 by means of an indexing carriage track 114.

FIG. 8 also shows a hydraulic cylinder 176 mounted atop the bending head frame 172 and along the same longitudinal axis thereof. Said cylinder activates the removal bending cams 178. This can best be seen and described in FIG. 10.

Figure 10:
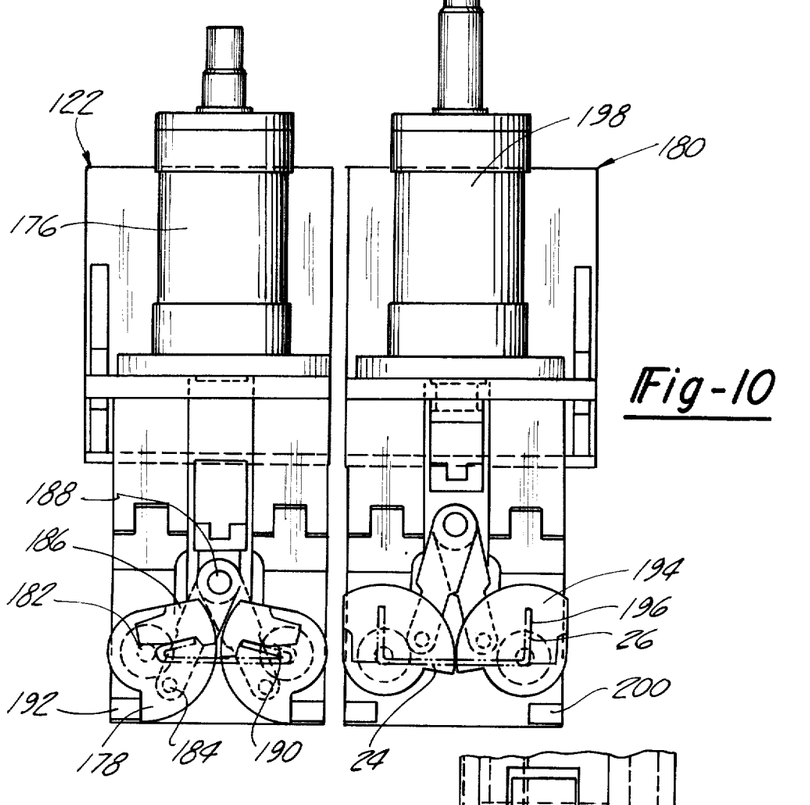
FIG. 10 is a side view of the removal and replacement bending heads.

FIG. 10 shows two bending heads, a removal bending head 122, and a replacement bending head 180. The only difference between the two heads is the shape of their respective bending cams. As a result, the description of the parts of one bending head is equally applicable to the corresponding parts of the other bending head except for the cams.

The removal bending cams 178 are rotatably mounted on removal cam rods 182 which are fixedly mounted within the removal bending head 122. Removal cam pins 184 are fixedly attached to and extend from said cams in the same plane as said cam rods 122. Removal link arms 186 are pivotally mounted on a common removal link arm rod 188 and are also pivotally mounted on their own removal cam pin 184. The removal link arm rod 188 is, in turn, fixedly mounted to the piston of the hydraulic cylinder 176. Removal cam wings 190 are also fixedly attached to said cams and extend in substantially the same direction as the longitudinal axis of the removal cam rods 182.

When the hydraulic cylinder 176 extends, the removal bending cams 178 rotate inwardly toward each other and thereby cause the removal cam wings 190 to bend the ears 26 of the retainer clip 24 inwardly and downwardly. Such bending continues until the removal bending cams 178 encounter the removal cam stops 192.

As previously mentioned, the replacement bending cams 194 are the only distinguishing factor between the removal and replacement bending heads 122, 180. Instead of wings 190, the replacement bending cams contain cam apertures 196 which are formed in said replacement cams 194 to accept the downturned ears of a retainer clip 24 when the replacement hydraulic cylinder 198 is extended and the replacement cams 194 engage their respective replacement cam stops 200. After the ears 26 of said retainer clip have been accepted in said apertures 196, the replacement hydraulic cyliner 198 is retracted a predetermined distance until the ears 26 are substantially perpendicular to the plane of the retainer clip 24.

Figures 11, 12:
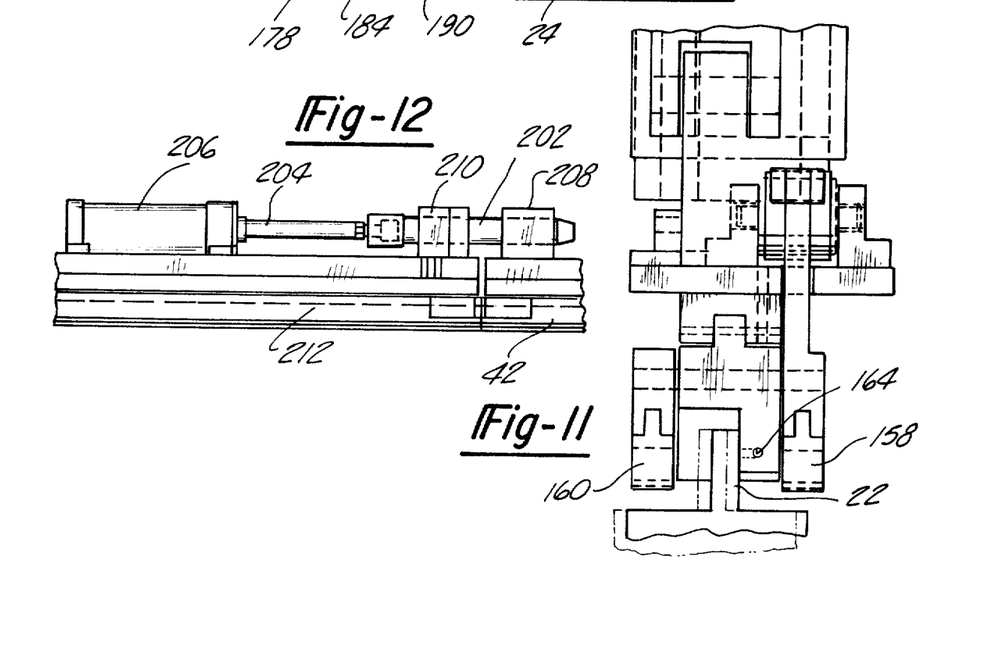
FIG. 11 is a partial side view of the removal clamping head.
FIG. 12 is a side view of the shot pin in the park position.

FIG. 12 shows a park position shot pin 202 fixedly attached to the cylinder rod 204 of the park hydraulic cylinder 206 which is extended. Said shot pin 202 maintains the co-linear relationship of bushings 208, 210 one of each is fixedly mounted on the park and primary carriage 212, 42. Said relationship is required to allow the secondary carriage 74 to enter its park position 214 as shown in FIG. 2. Said hydraulic cylinder rod 204 is retracted to allow the primary carriage 42 to travel with the conveyor 2. Said shot pin 202 can also be seen in FIG. 2.

The apparatus operates in the following manner. A damaged grate 16 is sighted by plant personnel who in turn inform the operator of the apparatus of the presence and row location of the damaged grate. The replacement clamping head 166 had prior to this time been loaded with a new grate while the secondary carriage 74 was in the park position 214. Said park position will be subsequently described in detail.

The operator then selects the proper strand row on his control console 14 which activates the secondary carriage drive motor 82 which causes the secondary carriage 74 to move toward said strand row. The grate row locating means 68 causes the secondary carriage 74 to stop over the selected row. The secondary carriage lock cylinder 92 is automatically activated causing the secondary carriage 74 and primary carriage 42 to be secured together.

When the damaged grate reaches a predetermined point before the maintenance area 12 the operator activates an engage button on the console 14. The engage button retracts the park position shot pin 202 and selectively activates the drive pins 52 which have previously been chosen from the six drive pins provided, to engage the chain link apertures 34.

Now the primary carriage 42 is attached to and moves with the conveyor 2. Because the auxiliary carriage 94 and the indexing carriage 110 are attached to the secondary carriage 74, all three carriages also move along with the conveyor. This feature is provided so that the removal and replacement of the damaged grate can be accomplished while the conveyor is in motion, thereby eliminating conveyor down-time.

Hence, the four carriages and all four working head will remain over the damaged grate, translating with the conveyor, until the damaged grate has been removed and replaced with a new grate. Now that the apparatus is synchronized with the conveyor, the removal and replacement processes automatically begin.

Referring to FIG. 4, the first head to operate is the removal clamping head 124. The clamping head mounting bracket 132 moves downwardly along the removal clamping head base 126 by means of a hydraulic motor 128 which turns a ball screw 130 as is shown in FIG. 9. After the clamping head 124 has been fully lowered, said head is now in close proximity to the tab 22 of the damaged grate, as is shown in FIG. 11.

A hunt cylinder 104 then causes the auxiliary carriage 94 to translate in a horizontal plane with respect to the secondary carriage 74 until a position indicating device, such as an air detect 164, informs the hunt cylinder 104 that "grate contact" has been made with the grate tab 22. The auxiliary carriage lock cylinder 100 then automatically extends to lock the auxiliary carriage 94 and the secondary carriage 74 together. At this time the removal clamping cylinder 148 extends and causes the clamping head jaws 158 and 160 to hold securely the damaged grate against the clamping member 138. When this occurs the proper relationship between the damaged grate 16 and the apparatus 6 is assured for removal and replacement operation at the damaged grate location.

Next, the removal bending head 122 automatically moves downwardly in the same fashion as the removal clamping head 124. The removal bending head 122 is equipped with two removal bending cams 178 (FIG. 10) which engage the grate's retainer clip ears 26 and simultaneously bends both ears inwardly to the bent position show in FIG. 10. Now the damaged grate 16 is free from the chain through rod 20. Next, the removal head pivot cylinder 134 is retracted causing the damaged grate to swing off the chain through rod 20.

The hydraulic motors 128 and 174 of the removal clamping and bending heads 124 and 122, respectively, are activated so as to raise the clamping head mounting bracket 132 and the bending head mounting bracket 170.

The indexing carriage 110 is then translated by means of ball screw 120 in such a manner that the replacement clamping and bending head 116 and 180 are positioned above the now-vacated damaged grate location.

As previously noted, the replacement clamping head 166 has already been loaded with a new grate. The ears of the new grate have been previously bent inwardly at a predetermined angle. The replacement bending head 180 is then moved downwardly in the same fashion as the removal bending head 122. The replacement clamping head 166 is then lowered downwardly and pivoted in the same fashion as the removal clamping head 124. The swinging motion causes the new grate to be placed on the chain through rod 20 and simultaneously causes the ears 26 of the new grate's retainer clip 24 to engage the apertures 196 of the replacement bending cams 194. Because the ears of the new grate had been previously bent inwardly, the retainer clip does not interfere with this engaging motion. The cams 194 of the replacement bending head 180 are caused to rotate by the hydraulic cylinder 198, and the ears are rotated upwardly, so that the retainer clip secures the new grate on the through rod 20. The replacement bending head 180 is then raised. The replacement clamping head 166 then unclamps the new grate, pivots away from same, and translates upwardly in that order. The drive pins 52 are then retracted from the conveyor chain and the primary carriage 42 returns to its start position.

During the travel of the primary carriage, the secondary carriage lock cylinder 92 retracts.

Once the primary carriage has returned to its start position, a park position shot pin 202, which is mounted on the park track 212 in the park position 214, is caused to extend by a cylinder 206. Said extension aligns the park track 212 and the primary carriage 42 so as to allow the secondary carriage 74 to enter the park position 214, as depicted in FIG. 2.

The damaged grate is now removed from the removal clamping head, and a new grate is placed in the replacement clamping head. The apparatus is now ready to remove and replace another damaged grate.

The apparatus may be manually cycled, thereby permitting the replacement of damaged grates when the conveyor is not moving. The operation is substantially identical with the aforementioned procedure except that the movement of the primary carriage is controlled by the operator alone.

We claim:

1. A method of utilizing an automatic system for selectively replacing articles which are removably interconnected to a movable conveyor, said system including:

first means for clampingly engaging a first article connected to said conveyor;

second means for disengaging said first article from said conveyor;

third means for positioning a second article on said conveyor at the same location previously occupied by said first article;

fourth means for connecting said second article to said conveyor;

fifth means for selectively moving said first, second, third, and fourth means; and sixth means, operably connected with said fifth means, for selectively engaging and disengaging said fifth means with and from said movable conveyor, respectively;

said method comprising the steps of:

engaging a first article connected to said conveyor;

disengaging said first article from said conveyor;

positioning a second article on said conveyor at the same location previously occupied by said first article;

connecting said second article to said conveyor;

selectively moving said first, second, third and fourth means;

selectively engaging and disengaging said fifth means with and from said movable conveyor, respectively, so that said fifth means moves with said conveyor while said first and second means are removing said first article from said conveyor, and disengaging said fifth means from said conveyor after said third and fourth means have connected said second article to said conveyor; and automatically controlling the operations and movements of said first, second, third, fourth, fifth and sixth means.

2. A method of utilizing an automatic system for selectively replacing articles which are removably interconnected to a stationary conveyor, said system including:

first means for clampingly engaging a first article connected to said conveyor;

second means disengaging said first article from said conveyor;

third means for positioning a second article on said conveyor at the same location previously occupied by said first article;

fourth means for connecting said second article to said conveyor;

fifth means for selectively moving said first, second, third and fourth means; and sixth means, operably connected with said fifth means, for selectively engaging and disengaging said fifth means with and from said movable conveyor, respectively;

said method comprising the steps of:

engaging a first article connected to said conveyor;

disengaging said first article from said conveyor;

positioning a second article on said conveyor at the same location previously occupied by said first article;

connecting said second article to said conveyor;

selectively moving said first, second, third and fourth means;

selectively engaging and disengaging said fifth means with and from said stationary conveyor, respectively; and automatically controlling the operations and movements of said first, second, third, fourth, fifth and sixth means.

3. An automatic system for selectively replacing articles which are removably interconnected to a movable conveyor, comprising, in combination:

first means for clampingly engaging a first article connected to said conveyor;

second means for disengaging said first article from said conveyor;

third means for positioning a second article on said conveyor at the same location previously occupied by said first article;

fourth means for connecting said second article to said conveyor;

fifth means for selectively moving said first, second, third and fourth means;

sixth means, operably connected with said fifth means, for selectively engaging and disengaging said fifth means with and from said movable conveyor, respectively, so that said fifth means moves with said conveyor while said first and second means are removing said first article from said conveyor, and said fifth means is disengaged from said conveyor after said third and fourth means have connected said second article to said conveyor; and seventh means for automatically controlling the operations and movements of said first, second, third, fourth, fifth and sixth means.

4. An automatic system according to claim 3, wherein:

said articles comprise grates;

said movable conveyor includes chain links interconnected by through rods; and each grate is removably secured to an associated through rod of said conveyor by means of a bendable retainer clip.

5. An automatic system according to claim 4, wherein said fifth means comprises:

a main support track which extends a predetermined distance along the longitudinal axis of said conveyor, and is disposed vertically above said conveyor on both sides thereof:

a primary carriage which is movably attached to said main support track such that said primary carriage is disposed vertically above said conveyor and is movable along the longitudinal axis of said conveyor;

a secondary carriage which is movably attached to said primary carriage such that said secondary carriage is disposed vertically above said conveyor and is movable transversally relative to said conveyor and is longitudinally movable relative to said primary carriage;

an auxiliary carriage which is movably attached to said secondary carriage such that said auxiliary carriage is disposed vertically above said conveyor and is movable relative to said secondary carriage in the same direction of motion described by the secondary carriage but with relatively limited displacement; and an indexing carriage which is movably attached to said auxiliary carriage such that said indexing carriage is disposed vertically above said conveyor and is movable relative to said auxiliary carriage in the same direction of motion described by said auxiliary carriage.

6. An automatic system according to claim 5, wherein said first means comprises a removal clamping head, including:

a base which is rigidly connected to said indexing carriage;

a mounting bracket which is slidably connected to said base;

means for mechanically translating said mounting bracket with respect to said base;

a clamping member which is pivotally attached to said mounting bracket;

means for mechanically rotating said clamping member with respect to said mounting bracket;

a clamping arm which is pivotally affixed to said clamping member;

means for mechanically rotating said clamping arm with respect to said clamping member; and means for detecting the proximity of a centrally disposed tab on each said grate.

7. An automatic system according to claim 5, wherein said second means comprises a removal bending head, including:
- a base which is rigidly connected to said indexing carriage;
- a mounting bracket which is slidably connected to said base;
- means for mechanically translating said mounting bracket with respect to said base;
- a frame which is rigidly connected to said mounting bracket;
- a pair of cams which are pivotally connected to said frame; and
- means for mechanically rotating said cams relative to said frame.

8. An automatic system according to claim 5, wherein said third means comprises a replacement clamping head, comprising:
- a base which is rigidly connected to said indexing carriage;
- a mounting bracket which is slidably connected to said base;
- means for mechanically translating said mounting bracket with respect to said base;
- a clamping member which is pivotally attached to said mounting bracket;
- means for mechanically rotating said clamping member with respect to said mounting bracket;
- a clamping arm which is pivotally affixed to said clamping member; and
- means for mechanically rotating said clamping arm with respect to said clamping member.

9. An automatic system according to claim 5, wherein said fourth means comprises a replacement bending head, including:
- a base which is rigidly connected to said indexing carriage;
- a mounting bracket which is slidably connected to said base;
- means for mechanically translating said mounting bracket with respect to said base;
- a frame which is rigidly connected to said mounting bracket;
- a pair of cams which are pivotally connected to said frame; and
- means for mechanically rotating said cams relative to said frame.

10. An automatic system according to claim 5, wherein said sixth means comprises:
- a plurality of downwardly extending arms rigidly attached to said primary carriage;
- said arms being disposed above said conveyor;
- said arms being provided with downwardly disposed end portions having a vertically-disposed aperture;
- a plurality of drive pins which slidably engage said apertures in said arms; and
- means for mechanically engaging said drive pins in said vertically disposed apertures.

* * * * *